(12) United States Patent
Borrelli et al.

(10) Patent No.: US 11,165,508 B2
(45) Date of Patent: Nov. 2, 2021

(54) COMMUNICATIONS SYSTEMS COMPRISING WAVEGUIDE ARRAYS FOR REALIZING LOCALIZED QUANTUM WALKS

(71) Applicant: CORNING INCORPORATED, Corning, NY (US)

(72) Inventors: Nicholas Francis Borrelli, Elmira, NY (US); Dan Trung Nguyen, Painted Post, NY (US); Daniel Aloysius Nolan, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/261,947

(22) PCT Filed: Jul. 11, 2019

(86) PCT No.: PCT/US2019/041403
§ 371 (c)(1),
(2) Date: Jan. 21, 2021

(87) PCT Pub. No.: WO2020/076387
PCT Pub. Date: Apr. 16, 2020

(65) Prior Publication Data
US 2021/0167866 A1 Jun. 3, 2021

Related U.S. Application Data

(60) Provisional application No. 62/703,088, filed on Jul. 25, 2018.

(51) Int. Cl.
*H04B 10/70* (2013.01)
*G06N 10/00* (2019.01)
*H04Q 11/00* (2006.01)

(52) U.S. Cl.
CPC ............. *H04B 10/70* (2013.01); *G06N 10/00* (2019.01); *H04Q 11/0005* (2013.01); *H04Q 2011/0032* (2013.01)

(58) Field of Classification Search
CPC ............... H04B 10/70; H04Q 11/0005; H04Q 2011/0032; G06N 10/00
See application file for complete search history.

(56) References Cited

U.S. PATENT DOCUMENTS

| 9,484,706 B1 | 11/2016 | Koponen et al. |
| 2002/0181868 A1 | 12/2002 | McGreer |
| (Continued) | | |

FOREIGN PATENT DOCUMENTS

CN          107357112 A     11/2017

OTHER PUBLICATIONS

A. Ambainis "Quantum walks and their algorithmic applications". Int. J. Quant. Inf. 1, 507 (2003).
(Continued)

*Primary Examiner* — Dzung D Tran
(74) *Attorney, Agent, or Firm* — Svetlana Z. Short

(57) ABSTRACT

A waveguide array that includes a plurality of waveguides disposed in a substrate. The plurality of waveguides include one or more first waveguides that have a first propagation constant and one or more second waveguides that have a second propagation constant, where the first propagation constant differs from the second propagation constant. The one or more first waveguides and the one or more second waveguides are disposed in the substrate in a linear distribution and at least a portion of the linear distribution is arranged based on a quasi-periodic sequence having a plurality of sequence segments. Each sequence segment is determined based on a quasi-periodic function, has an order, and corresponds to an arrangement segment of a first wave- (Continued)

guide, a second waveguide, or combinations thereof. The linear distribution includes at least one arrangement segment corresponding with a third-order sequence segment or higher of the quasi-periodic sequence.

20 Claims, 7 Drawing Sheets

(56) References Cited

U.S. PATENT DOCUMENTS

| | | |
|---|---|---|
| 2003/0031438 A1* | 2/2003 | Kambe .................. G02B 1/02 385/122 |
| 2004/0037505 A1* | 2/2004 | Morin ............... G02B 6/29356 385/37 |
| 2005/0145783 A1 | 7/2005 | Zheng |
| 2006/0092500 A1* | 5/2006 | Melloni ............... G02F 1/3536 359/330 |
| 2007/0280592 A1 | 12/2007 | Furuya et al. |
| 2007/0280613 A1* | 12/2007 | Inoue ..................... G02F 1/365 385/122 |
| 2011/0286477 A1* | 11/2011 | Kuksenkov .......... G02F 1/3558 372/22 |
| 2013/0156393 A1 | 6/2013 | Kokubun et al. |
| 2014/0328556 A1* | 11/2014 | Rubio Guivernau ....................... G02B 6/29376 385/1 |
| 2015/0236791 A1 | 8/2015 | Nordholt et al. |
| 2017/0160474 A1 | 6/2017 | Mahmoodian et al. |
| 2017/0293082 A1 | 10/2017 | Mower et al. |
| 2018/0299613 A1 | 10/2018 | Nakanishi et al. |
| 2019/0033513 A1 | 1/2019 | Sasaki et al. |
| 2020/0348463 A1 | 11/2020 | Mukasa |

OTHER PUBLICATIONS

A. Montanaro, "Quantum algorithms: an overview," npj Quant. Inf. 2, 15023 (2016).
Boguslawski et al., "Light localization in optically induced deterministic aperiodic Fibonacci lattices," Optica 3(7), 711-717 (2016).
Chandrashekar et al., "Localized quantum walks as secured quantum memory", Europhys. Letts. vol. 110, 10005 (2015).
Childs et al., "Universal computation by multiparticle quantum walk". Science 339, 791 (2013).
Crespi et al. "Anderson localization of entangled photons in an integrated quantum walk". Nature Photonics 7, 322 (2013).
Gellermann et al., "Localization of light waves in Fibonacci dielectric multilayers." Phys. Rev. Lett. 72, 633-636 (1994).
Harris et al., "Quantum Random Walks in a Programmable Nanophotonic Processor". CLEO FW4A.5 (Optical Society of America, 2015).
International Search Report and Written Opinion of the International Searching Authority; PCT/US2019/041403; dated June 29, 2020; 11 pages; Korean Intellectual Property.
Kohmoto et al., "Localization of optics: Quasiperiodic media", Phys. Rev. Lett. vol. 58, 2436 (1987).
Leonetti et al., "Secure information transport by transverse localization of light." Sci. Rep. 6, 29918; (2016).
Levine et al., "Quasicrystals: A new class of ordered structures". Phys. Rev. Lett. 53, 2477 (1984).
Lovett et al., "Universal quantum computation using the discrete-time quantum walk," Phys. Rev. A81, 042330 (2010).
Lucic et al., "Light propagation in quasi-periodic Fibonacci waveguide arrays," J. Opt. Soc. Am. B 32(7), 1510-1513 (2015).
Macia, Enrique, "Exploiting quasiperiodic order in the design of optical devices", Phys. Rev. B 63 205421 (2001).
Macia, Enrique, "Optical engineering with Fibonacci dielectric multilayers", Appl. Phys. Lett. vol. 73, 3330 (1998).
Martin et al., "Anderson localization in optical waveguide arrays with off-diagonal coupling disorder." Opt. Express vol. 19, 13636 (2011).
Mosley et al., "Reconstructing Core-to-Core Variations of Propagation Constant in Coupled Multicore Fiber for Quantum Walks," in CLEO: 2015, OSA Technical Digest (online) (Optical Society of America, 2015), paper SM2L.4.
Nguyen et al., "Multiple spectral window mirrors based on Fibonacci chains of dielectric layers" Opt. Comm. vol. 283, 4199 (2010).
Nielsen et al., "Quantum computation and quantum information", Cambridge University Press 2010.
Owens et al., "Two-photon quantum walks in an elliptical direct-write waveguide array," New J. of Physics 13, 075003 (2011).
Perets et al., "Realization of quantum walks with negligible decoherence in waveguide lattices," Phys. Rev. Lett. 100, 170506 (2008).
Peruzzo et al. "Quantum walks of correlated photons". Science 329, 1500-1503 (2010).
Sansoni, et al. "Two-Particle Bosonic-Fermionic Quantum Walk via Integrated Photonics". Phys. Rev. Lett. 108, 010502 (2012).
Spring et al., "Boson sampling on a photonic chip," Science 339, 798-801 (2012).
Tang et al., "Experimental two-dimensional quantum walks on a photonic chip," Sci. Adv. 4: eaat3174 (2018).
Wikipedia, "Fibonacci number", available online at <https://en.wikipedia.org/w/index.php?title=Fibonacci_number&oldid=980404449>, Sep. 26, 2020, 24 pages.
Bromberg et al., "Quantum and Classical Correlations in Waveguide Lattices", PRL 102, 253904 (2009).

* cited by examiner

COMMUNICATIONS SYSTEMS COMPRISING WAVEGUIDE ARRAYS FOR REALIZING LOCALIZED QUANTUM WALKS

CROSS REFERENCE TO RELATED APPLICATIONS

This application claims the benefit of priority under 35 U.S.C. § 371 of International Application No. PCT/US2019/041403, filed on Jul. 11, 2019, which claims the benefit of priority under 35 U.S.C. § 120 of U.S. Application Ser. No. 62/703,088 filed on Jul. 25, 2018, the content of which is relied upon and incorporated herein by reference in its entirety.

BACKGROUND

The present disclosure relates to communications systems comprising waveguide arrays. More specifically, the present disclosure relates communications systems comprising waveguide arrays that have waveguides arranged in a quasi-periodic sequence for realizing localized quantum walks.

SUMMARY

According to the subject matter of the present disclosure, a waveguide array includes a plurality of waveguides disposed in a substrate. The plurality of waveguides include one or more first waveguides and one or more second waveguides. The one or more first waveguides have a first propagation constant, the one or more second waveguides have a second propagation constant, and the first propagation constant is different than the second propagation constant. The one or more first waveguides and the one or more second waveguides are disposed in the substrate in a linear distribution and at least a portion of the linear distribution is arranged based on a quasi-periodic sequence having a plurality of sequence segments. Further, each sequence segment is determined based on a quasi-periodic function, each sequence segment has an order, each sequence segment corresponds to an arrangement segment of one or more first waveguides, one or more second waveguides, or a combination thereof. Moreover, the linear distribution of the first and second waveguides disposed in the substrate includes at least one arrangement segment corresponding with a third-order sequence segment or higher of the quasi-periodic sequence.

In accordance with one embodiment of the present disclosure a method of determining a photon probability distribution includes directing a plurality of photons generated using a photon generator into an input end of an individual waveguide of a waveguide array. The waveguide array includes a plurality of waveguides disposed in a substrate. The plurality of waveguides include one or more first waveguides and one or more second waveguides. The one or more first waveguides have a first propagation constant, the one or more second waveguides have a second propagation constant, and the first propagation constant is different than the second propagation constant. The one or more first waveguides and the one or more second waveguides are disposed in the substrate in a linear distribution and at least a portion of the linear distribution is arranged based on a quasi-periodic sequence having a plurality of sequence segments. Further, each sequence segment is determined based on a quasi-periodic function, each sequence segment has an order, each sequence segment corresponds to an arrangement segment of one or more first waveguides, one or more second waveguides, or a combination thereof. Moreover, the linear distribution of the first and second waveguides disposed in the substrate includes at least one arrangement segment corresponding with a third-order sequence segment or higher of the quasi-periodic sequence. The method further includes receiving the plurality of photons using a plurality of photon detectors, where each of the plurality of photon detectors is optically coupled to an output end of at least one of the plurality of waveguides and determining a photon probability distribution based on the plurality of photons received by the plurality of photon detectors.

Although the concepts of the present disclosure are described herein with primary reference to quantum walks, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
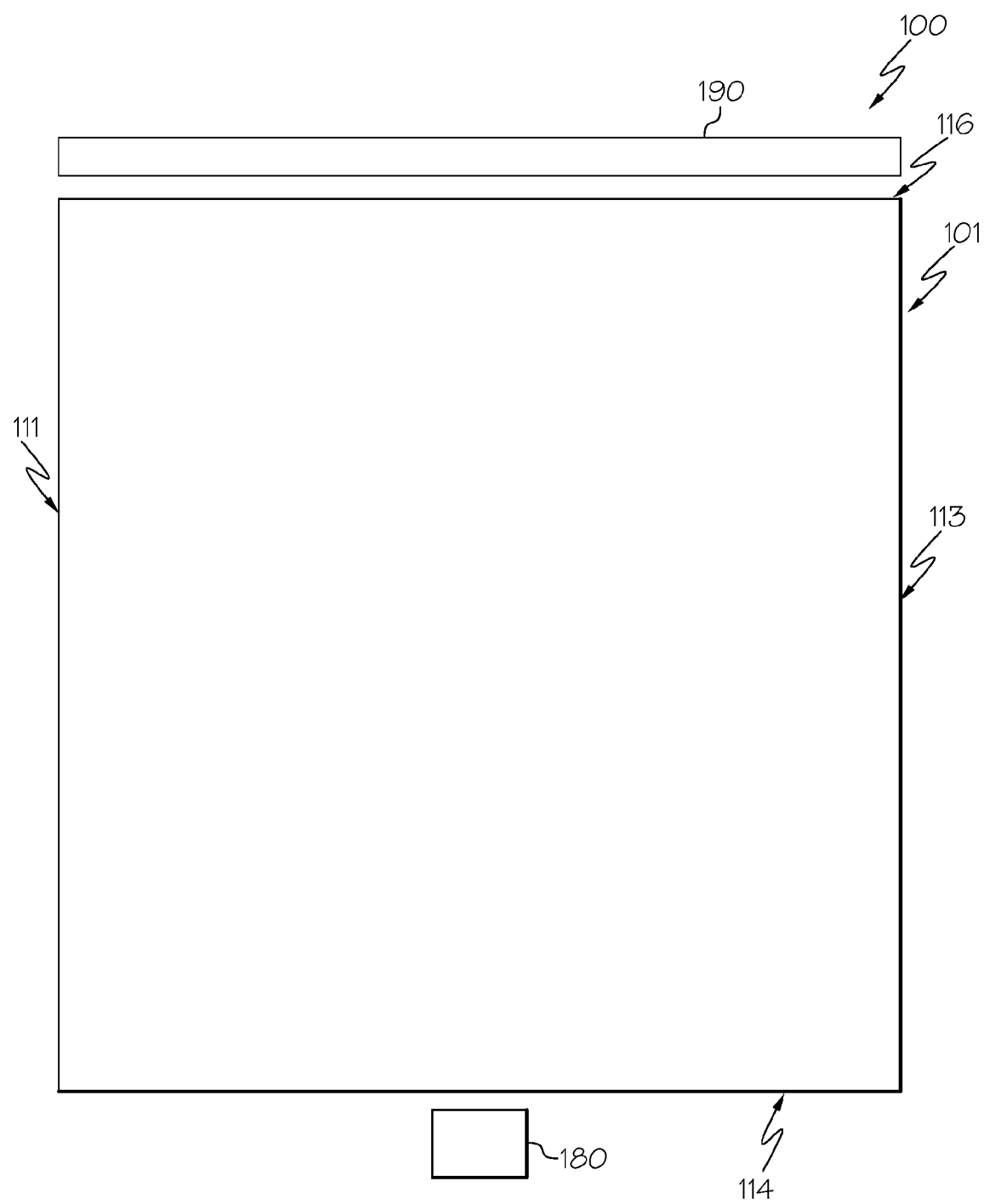
FIG. 1 schematically depicts a communications system including a photon generator, a waveguide array, and a photon detector, according to one or more embodiments shown and described herein.

Quantum walks have a variety of potential applications in quantum communications and quantum computing, for example, in the development of quantum algorithms and quantum simulations. Quantum walks may increase computing speed and facilitate problem solving that is not feasible using a classical computer. In addition, photons are useful for performing a quantum walk due to the dual wave-particle nature of photons. One phenomenon that occurs in a quantum walk is localization, which is the absence of diffusion of waves in a disordered medium. Localized quantum walks may result in symmetrical probability distributions and thus localized quantum walks show potential for applications in quantum communication, for example, using localized photonic states for the secure transmission of information and using localized photonic states as a quantum memory. Localized quantum walks may be realized using randomly disordered systems of waveguides (e.g., spatially or temporally disordered), but this requires a large number of randomly disorder systems and the randomness of each system needs to be controlled within a defined range of the disorder. Further, localized quantum walks that result in symmetrical probability distributions are impossible in spatially random disorder systems and while localized quantum walks with symmetrical probability distribution are possible with temporally random disorder systems by using multiple quantum coins, the multiple quantum coin approach is difficult to implement practically. Thus, improved methods and systems for realizing localized quantum walks are desired.

Reference will now be made in detail to embodiments of a communications system for realizing improved localized quantum walks. The communications system includes a waveguide array comprising a substrate and a plurality of waveguides comprising one or more first waveguides and one or more second waveguides disposed in the substrate. The one or more first waveguides and one or more second waveguides comprise differing propagation constants and are arranged in a quasi-periodic sequence. As used herein, a "quasi-periodic sequence" refers to a sequence arranged with a designed pattern that lacks translational symmetry. In addition, a structure (such as the waveguide array) that is made using a quasi-periodic sequence is made using building blocks (e.g., arrangement segments of waveguides) that are arranged using a designed pattern that lacks translational symmetry. The quasi-periodic sequence of first and second waveguides forms a deterministic disorder system and thus quantum walks performed by directing one or more photons into one or more waveguides of the waveguide array are localized and result in a symmetrical probability distribution that is predictable, controllable, and repeatable. While not intending to be limited by theory, localized quantum walks performed in a disordered system, such as the communication system described herein, can be used to store information regarding an initial state of qubits and thus may be used as part of a secured quantum memory. Further, storage time of a quantum memory will be directly related to the number of implementable steps of the quantum walk. Without localization, the size of the position space required to store the information increases linearly with time, making it challenging to store information for long durations.

Figure 2A:
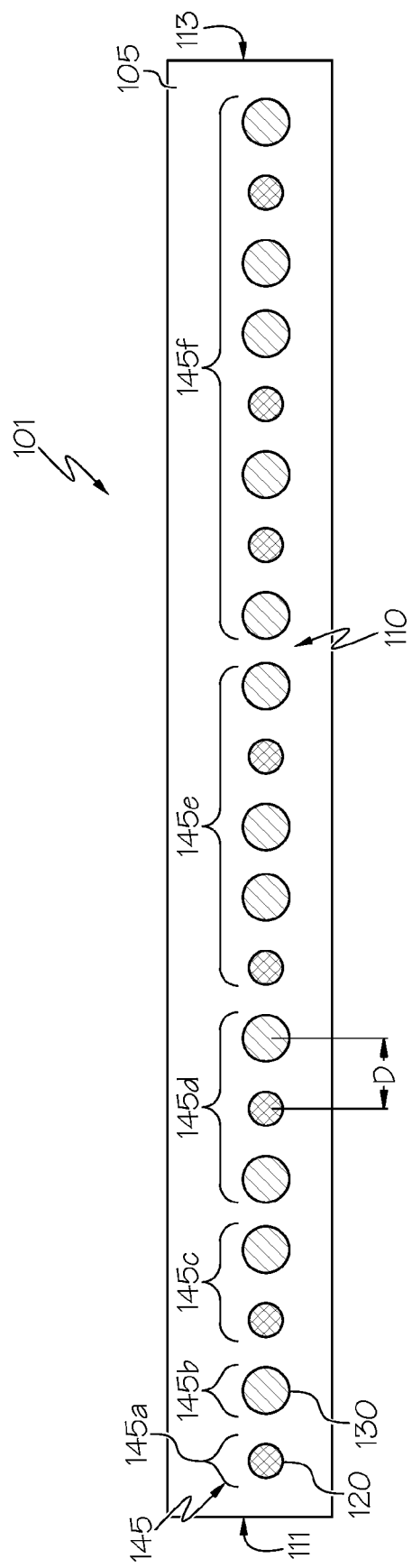
FIG. 2A schematically depicts a cross-section of an example waveguide array, according to one or more embodiments shown and described herein.
Figure 2B:
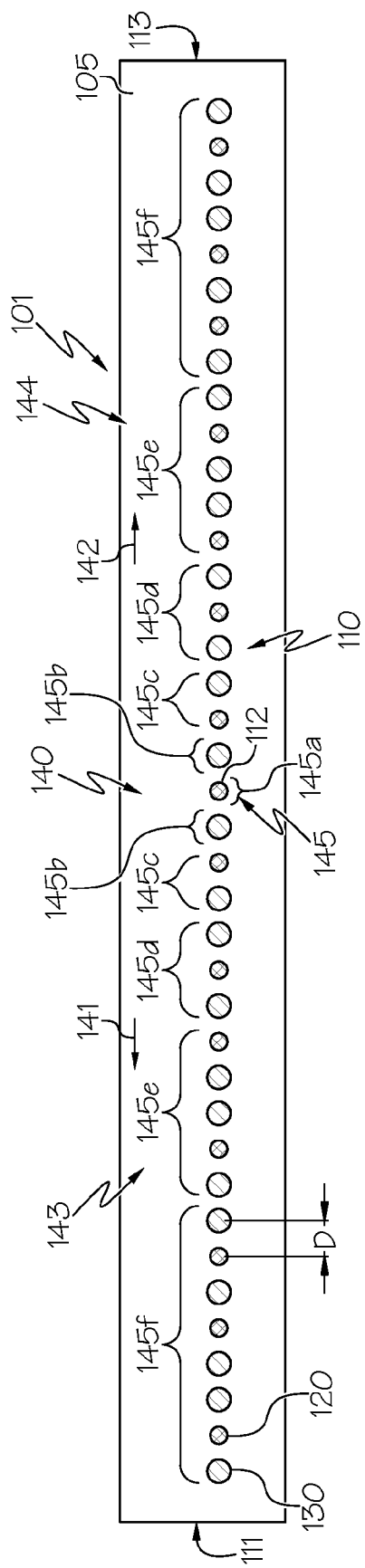
FIG. 2B schematically depicts a cross-section of another example waveguide array, according to one or more embodiments shown and described herein.
Figure 2C:
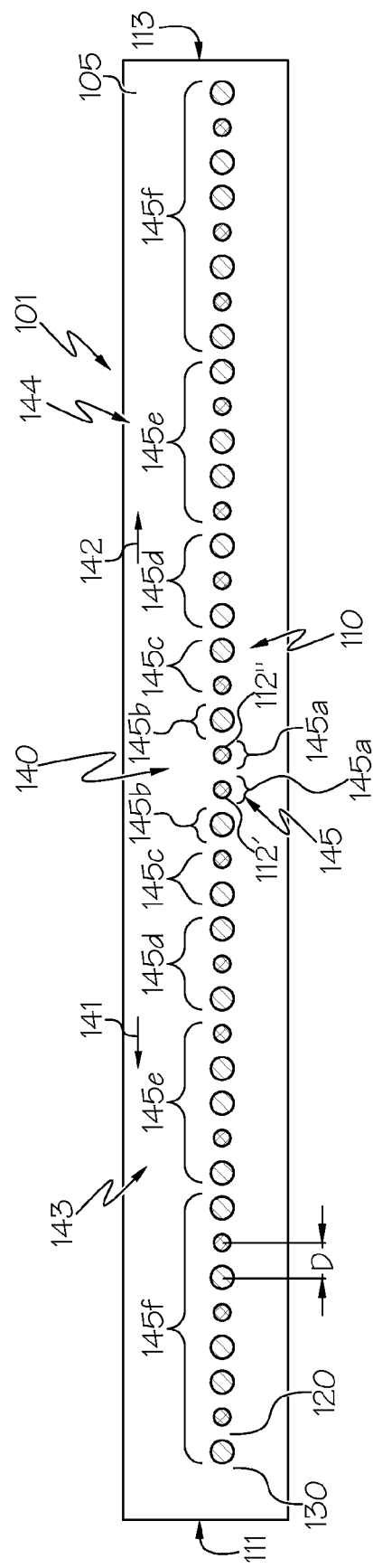
FIG. 2C schematically depicts a cross-section of another example waveguide array, according to one or more embodiments shown and described herein.

Referring now to FIGS. 1-2C, a communications system 100 (FIG. 1) comprising a waveguide array 101 is depicted. The waveguide array 101 comprises a plurality of waveguides 110 (FIGS. 2A-2C), such as single mode waveguides, disposed in a substrate 105, which may be a cladding. The plurality of waveguides 110 comprises one or more first waveguides 120 and one or more second waveguides 130. The one or more first waveguides 120 and the one or more second waveguides 130 are disposed in the substrate 105 in a linear distribution 140. In addition, the communications system 100 comprises one or more photon generators 180 optically coupled to an input end 114 of at least one of the plurality of waveguides 110 and one or more photon detectors 190 optically coupled to an output end 116 of at least one of the plurality of waveguides 110. For example, in some embodiments, at least one photon detector of the one or more photon detectors 190 is optically coupled to the output end 116 of the plurality of waveguides 110.

In operation, the communications system 100 may be used to perform a quantum walk, which may be used to determine a photon probability distribution. For example, performing the quantum walk may comprise directing a plurality of photons generated using the photon generator 180 into the input end 114 of one or more individual waveguides of the waveguide array 101, receiving the plurality of photons using one or more photon detectors 190, and determining a photon probability distribution based on the plurality of photons received by the one or more photon detectors 190. As used herein, a "photon probability distribution," is a distribution function that represents the probabilities of a photon that is directed into the input end 114 of the waveguide array 101 exiting the output end 116 of each individual waveguide of the plurality of waveguides 110 of the waveguide array 101.

Referring now to FIGS. 2A-2C, adjacent waveguides of the plurality of waveguides 110 disposed in the linear distribution 140 are spaced apart from one another by a spacing distance D. While not intending to be limited by theory, during a quantum walk, each photon "walks" through the waveguide array 101, moving between adjacent waveguides via evanescent coupling while propagating from the input end 114 of the waveguide array 101 to the output end 116 of the waveguide array 101. Thus, the spacing distance D between adjacent waveguides is close enough for evanescent coupling to occur, for example, the spacing distance D may comprise about 30 μm or less, for example, about 25 μm or less, about 20 μm or less, about 15 μm or less, about 10 m or less, about 5 μm or less, or the like. Further, in some embodiments, adjacent waveguides of the plurality of waveguides 110 may be uniformly spaced in the linear distribution 140.

The one or more first waveguides 120 comprise a first propagation constant and the one or more second waveguides 130 comprise a second propagation constant. Without intending to be limited by theory, the propagation constant of a waveguide determines how the amplitude and phase of light propagating in the waveguide with a given frequency varies along a propagation direction. In the embodiments described herein, the first propagation constant is different than the second propagation constant. The propagation constant depends on a number of factors, such as the refractive index of the waveguide and the diameter of the waveguide. The propagation constant may be determined by the V-number V, where $$V = (2\pi a)\left(\frac{NA}{\lambda}\right), NA = (n_{WG} - n_{CLAD})^{\frac{1}{2}},$$

$n_{WG}$ is the refractive index of an individual waveguide of the plurality of waveguides 110, $n_{CLAD}$ is the refractive index of the substrate 105, $a_1$ is a radius of an individual waveguide of the plurality of waveguides 110, and λ is the wavelength of one or more photons propagating along the plurality of waveguides 110. Further, the one or more first waveguides 120 comprise a first V-number $V_1$, the one or more second waveguides 130 comprise a second V-number $V_2$, and the first V-number $V_1$ is different than the second V-number $V_2$. In particular, the first V-number $$V_1 = (2\pi a_1)\left(\frac{NA_1}{\lambda}\right), \text{ where } NA_1 = (n_{WG1} - n_{CLAD})^{\frac{1}{2}},$$

$n_{WG1}$ is the refractive index of the one or more first waveguides 120, $n_{CLAD}$ is the refractive index of the substrate 105, $a_1$ is a radius of the one or more first waveguides 120, and $\lambda$ is the wavelength of one or more photons propagating along the plurality of waveguides 110 and the second V-number $$V_2 = (2\pi a_2)\left(\frac{NA_2}{\lambda}\right) \text{ where } NA_1 = (n_{WG1} - n_{CLAD})^{\frac{1}{2}},$$

$n_{WG2}$ is the refractive index of the one or more second waveguides 130, $n_{CLAD}$ is the refractive index of the substrate 105, $a_2$ is a radius of the one or more second waveguides 130, and $\lambda$ is the wavelength of one or more photons propagating along the plurality of waveguides 110. Moreover, as the one or more first waveguides 120 and the one or more second waveguides 130 are single mode waveguides, the first V-number $V_1$ and the second V-number $V_2$ are less than 2.405.

As shown mathematically by the V-number, two waveguides that comprise different refractive indices may comprise different propagation constants and two waveguides that comprise different diameters may comprise different propagation constants. For example, the one or more first waveguides 120 comprise a first diameter and a first refractive index and the one or more second waveguides 130 comprise a second diameter and a second refractive index. To achieve differing propagation constants, the first diameter may be different than the second diameter, the first refractive index may be different than the second refractive index, or both.

Moreover, while not intending to be limited by theory, fields of the waves (e.g., light waves) propagating in the waveguide array 101 of first and second waveguides 120, 130 may be coupled and the waveguide array 101 may comprise a first coupling coefficient $\kappa_{12}$ (i.e. the coupling coefficient for coupling from a second waveguide 130 to a first waveguide 120) and a second coupling coefficient $\kappa_{21}$ (i.e., the coupling coefficient for coupling from a first waveguide 120 to a second waveguide 130), which represent the amount of couplings between the fields in the two waveguides. In other words, coupling coefficients measure the amount of overlap between the modal fields $\psi_1(x,y)$ and $\psi_2(x,y)$ in a first waveguide 120 and a second waveguide 130, respectively. Thus, each coupling coefficient $\kappa$ is governed by an overlap integral, which indicates the behavior of the coupling between the modal fields resulting in a transfer of energy from one waveguide to the other. Further, the first coupling coefficient $\kappa_{12}$ is different than the second coupling coefficient $\kappa_{21}$. In general, the modal fields in waveguides $\psi_1(x,y)$ and $\psi_2(x,y)$ depend on various parameters such as the widths (e.g., diameters) of the waveguides, the refractive indices of the waveguides $n_1(x,y)$, $n_2(x,y)$, the material of the substrate 105, and the wavelength of operation ($\lambda$). While not intending to be limited by theory, the coupling coefficients $\kappa_{12}$ and $\kappa_{21}$ may be mathematically represented by $$\kappa_{12} = \frac{k_0^2}{2\beta_1} \frac{\iint_{-\infty}^{\infty} \psi_1^* \Delta n_1^2 \psi_2 dxdy}{\iint_{-\infty}^{\infty} \psi_1^* \psi_1 dxdy} \text{ and}$$

$$\kappa_{21} = \frac{k_0^2}{2\beta_2} \frac{\iint_{-\infty}^{\infty} \psi_2^* \Delta n_2^2 \psi_1 dxdy}{\iint_{-\infty}^{\infty} \psi_2^* \psi_2 dxdy}$$

where $b_1$ is the propagation constant of the first waveguide 120, $b_2$ is the propagation constant of the second waveguide 130, $$k_0 = \frac{2\pi}{\lambda}, \Delta n_1^2 = n_T^2 - n_2^2, \text{ and } \Delta n_2^2 = n_T^2 - n_1^2,$$

and where $n_T(x,y)$ is the index profile of a two waveguide portion of the waveguide array 101 that comprises an individual first waveguide 120 adjacent an individual second waveguide 130.

Referring still to FIGS. 2A-2C, at least a portion of the linear distribution 140 is arranged based on a quasi-periodic sequence of the one or more first waveguides 120 and the one or more second waveguides 130. In other words, the linear distribution 140 is arranged such that the first and second propagation constants vary quasi-periodically and as such, the linear distribution 140 is both an on-diagonal disorder system and an off-diagonal disorder system. While not intending to be limited by theory, varying propagation constants quasi-periodically causes on-diagonal disorder, varying coupling coefficients quasi-periodically causes off-diagonal disorder, and systems that include on-diagonal disorder, such as the linear distribution 140, exhibit stronger localization than systems that only include off-diagonal disorder.

The quasi-periodic sequence comprises a plurality of sequence segments. Each sequence segment is determined based on a quasi-periodic function and comprises an order (e.g., an order of the quasi-periodic sequence, such as a first order, second order, third order, or the like). Further, each sequence segment corresponds to an arrangement segment 145 of one or more first waveguides 120, one or more second waveguides 130, or a combination thereof. Each arrangement segment 145 may comprise a single waveguide or may comprise multiple waveguides. For example, in the embodiments depicted in FIGS. 2A-2C, the linear distribution 140 comprises arrangement segments 145 that correspond with six orders of sequence segments, i.e., a first-order arrangement segment 145a, a second-order arrangement segment 145b, a third-order arrangement segment 145c, a fourth-order arrangement segment 145d, a fifth-order arrangement segment 145e, and a sixth-order arrangement segment 145f. However, it should be understood that other linear distributions 140 are contemplated. For example, the linear distribution 140 may comprise a portion that follows a quasi-periodic sequence and another portion that does not. In addition, the portion of the linear distribution 140 that follows a quasi-periodic sequence may comprise any one or more sequence segments of a quasi-periodic sequence, not just the initial sequence segments of the quasi-periodic sequence. Example quasi-periodic sequences include the Fibonacci sequence, the Thue-Morse sequence, and the Rudin-Shapiro sequence. It should be noted that the example linear distributions 140 depicted in FIGS. 2A-2B follow the Fibonacci sequence, but other linear distributions are contemplated.

When the quasi-periodic sequence is a Fibonacci sequence, the quasi-periodic function of the Fibonacci sequence comprises $S_{N+1}=S_{N-1}S_N$, where $S_N$ comprises an N-order sequence segment and corresponds to an N-order arrangement segment. $S_1=A$, where A comprises a first-order sequence segment and corresponds to a first-order arrangement segment 145a comprising an individual first waveguide 120 and $S_2=B$, where B comprises a second-order sequence segment and corresponds to a second-order arrangement segment 145b comprising an individual second waveguide 130. $S_3=S_1S_2=AB$, where AB comprises a third-order sequence segment and corresponds to a third-order arrangement segment 145c comprising the first-order arrangement segment 145a adjacent the second-order arrangement segment 145b. In particular, the third-order arrangement segment 145c comprises an individual first waveguide 120 disposed directly adjacent an individual second waveguide 130. $S_4=S_2S_3=BAB$, where BAB comprises the fourth-order sequence segment and corresponds to a fourth-order arrangement segment 145d comprising the second-order arrangement segment 145b adjacent the third-order arrangement segment 145c. In particular, the fourth-order arrangement segment 145d segment comprises an individual first waveguide 120 disposed directly between two individual second waveguides 130. $S_5=S_3S_4=ABBAB$, where ABBAB comprises the fifth-order sequence segment and corresponds to a fifth-order arrangement segment 145e comprising the third-order arrangement segment 145c adjacent the fourth-order arrangement segment 145d. Furthermore, $S_6=S_4S_5=BAB$, where BABABBAB comprises the sixth-order sequence segment and corresponds to a sixth-order arrangement segment 145f comprising the fourth-order arrangement segment 145d adjacent the fifth-order arrangement segment 145e.

The Thue-Morse sequence is a binary sequence (an infinite sequence of 0s and 1s) obtained by starting with 0 and successively appending the Boolean complement of the sequence obtained thus far. The first few steps of this sequence yield the strings 0 then 01, 0110, 01101001, 0110100110010110, and so on. The Boolean complement is the opposite digit(s) in a binary system, for example the Boolean complement of 1 is 0, the Boolean complement of 0 is 1, and the Boolean complement of 101 is 010. When the quasi-periodic sequence is a Thue-Morse sequence, the quasi-periodic function of the Thue-Morse sequence comprises $T_{N+1}$ $T_N\overline{T_N}$, where $T_N$ comprises a N-order sequence segment and corresponds to an N-order arrangement segment 145 and $\overline{T_N}$ comprises a sequence segment of the Boolean complement of the $T_N$ sequence segment and corresponds to the Boolean complement of the N-order arrangement segment 145.

In the Thue-Morse sequence, $T_1=A$, where A comprises a first-order sequence segment and corresponds to a first-order arrangement segment 145a comprising an individual first waveguide 120. $T_2=B$, where B comprises a second-order sequence segment and corresponds to a second-order arrangement segment 145b comprising an individual second waveguide 130. $T_3=T_2T_2=BA$, where BA comprises a third-order sequence segment and corresponds to a third-order arrangement segment 145c comprising the second-order arrangement segment 145b adjacent the Boolean complement of the second-order arrangement segment 145b. In particular, the third-order arrangement segment 145c comprises an individual second waveguide 130 directly adjacent an individual first waveguide 120. $T_4=T_3\overline{T_3}=BAAB$, where BAAB comprises the fourth-order sequence segment and corresponds to a fourth-order arrangement segment 145d comprising the third-order arrangement segment 145c adjacent the Boolean complement of the third-order arrangement segment 145c. In particular, the fourth-order arrangement segment 145d comprises a pair of directly adjacent first waveguides 120 positioned directly between pair of second waveguides 130. $T_5=T_4\overline{T_4}=BAABABBA$, where ABBAB comprises a fifth-order sequence segment and corresponds to a fifth-order arrangement segment 145e comprising the fourth-order arrangement segment 145d adjacent the Boolean complement of the fourth-order arrangement segment 145d. Further, $T_6=T_5\overline{T_5}=BAABABBAABBABAAB$, where BAABABBAABBABAAB comprises a sixth-order sequence segment and corresponds to a sixth-order arrangement segment 145f comprising the fifth-order arrangement segment 145e adjacent the Boolean complement of the fifth-order arrangement segment 145e.

When the quasi-periodic sequence is a Rudin-Shapiro sequence, the quasi-periodic function of the Rudin-Shapiro sequence comprises a four-element substitution sequence with the following rules: P→PQ, Q→PR, R→SQ, and S→SR. Thus, a first-order sequence segment $S_1=P$, a second-order sequence segment $S_2=PQ$, a third-order sequence segment $S_3=PQPR$, a fourth-order sequence segment $S_4=PQPRPQSQ$, a fifth-order sequence segment $S_5=PQPRPQSQPRSRPR$, and so on. Further, to obtain a sequence of only two elements, A and B, the four-element sequence may be mapped onto a two element sequence where (P,Q)→A and (R,S)→B. Each instance of A corresponds to an individual first waveguide 120 of an arrangement segment 145 and each instance of B corresponds to an individual second waveguide 130 of an arrangement segment 145. Thus, $S_1=A$, where $S_1$ is a first-order sequence segment corresponding with a first-order arrangement segment 145a that comprises A, $S_2=AA$, where $S_2$ is a second-order sequence segment corresponding with a second-order arrangement segment 145b that comprises AA, $S_3=AAAB$, where $S_3$ is a third-order sequence segment corresponding with a third-order arrangement segment 145c that comprises AAAB, $S_4=AAABAABA$, where $S_4$ is a fourth-order sequence segment corresponding with a fourth-order arrangement segment 145d that comprises AAABAABA, and $S_5=AAABAABAABBBAB$, where $S_5$ is a fifth-order sequence segment corresponding with a fifth-order arrangement segment 145e that comprises AAABAABAABBBAB, and so on.

Referring now to FIG. 2A, in some embodiments, the linear distribution 140 of the one or more first waveguides 120 and the one or more second waveguides 130 comprises a quasi-periodic sequence in which the lowest order arrangement segment 145 is positioned on a first side 111 of the waveguide array 101 (e.g., the first-order arrangement segment 145a is positioned on the left side of the waveguide array 101 in FIG. 2A) and the highest order arrangement segment is positioned on a second side 113 of the waveguide array 101, which is opposite the first side 111 (e.g., the sixth-order arrangement segment 145f is positioned on the right side of the waveguide array 101 in FIG. 2A). As depicted in FIG. 2A, the arrangement segments 145 of the linear distribution 140 may increase stepwise, in order, from the first side 111 to the second side 113 (e.g., from the first-order arrangement segment 145a on the left, stepwise to the sixth-order arrangement segment 145f on the right). Moreover, while FIG. 2A depicts that the entire linear distribution 140 comprises a quasi-periodic sequence extending in both the first direction 141 and the second direction 143, it should be understood that the entire linear distribution 140 or merely a portion of the linear distribution 140 may comprise a quasi-periodic sequence.

Referring now to FIG. 2B, in some embodiments, the plurality of waveguides 110 comprise a central waveguide 112 that separates a first section 142 of the linear distribution 140 from a second section 144 of the linear distribution 140. The first section 142 of the linear distribution 140 extends in a first direction 141 from the central waveguide 112 and comprises a quasi-periodic sequence of first waveguides 120 and second waveguides 130. The second section 144 of the linear distribution 140 extends in a second direction 143 from the central waveguide 112 and comprises a quasi-periodic sequence of first waveguides 120 and second waveguides 130. In some embodiments, the central waveguide 112 comprises the first-order arrangement segment 145a for each of the quasi-periodic sequences that extend in both the first direction 141 and the second direction 143. The quasi-periodic sequences that extend in the first direction 141 and the second direction 143 may mirror one another. For example, in FIG. 2B, the quasi-periodic sequence extending both the first direction 141 and the second direction 143 comprises a Fibonacci sequence and include the first-order arrangement segment 145a (i.e., the shared central waveguide 112) through the sixth-order arrangement segment 145f. Moreover, while FIG. 2B depicts a plurality of waveguides 110 that include the central waveguide 112 and quasi-periodic sequences extending in both the first direction 141 and the second direction 143, it should be understood that the entire linear distribution 140 or merely a portion of the linear distribution 140 may comprise a quasi-periodic sequence.

Referring now to FIG. 2C, in some embodiments, the plurality of waveguides 110 comprise a first central waveguide 112' adjacent a second central waveguide 112". In the embodiment depicted in FIG. 2C, the linear distribution 140 extends in the first direction 141 from the first central waveguide 112' and comprises a quasi-periodic sequence of first waveguides 120 and second waveguides 130. In particular, the first central waveguide 112' comprises the first-order arrangement segment 145a of the quasi-periodic sequence that extends in the first direction 141. Furthermore, the linear distribution 140 extends in the second direction 143 from the second central waveguide 112" and comprises a quasi-periodic sequence of first waveguides 120 and second waveguides 130. In particular, the second central waveguide 112" comprises the first-order arrangement segment 145a of the quasi-periodic sequence that extends in the second direction 143. The quasi-periodic sequences that extend in the first direction 141 and the second direction 143 may mirror one another. For example, in FIG. 2C, the quasi-periodic sequence extending both the first direction 141 and the second direction 143 comprises a Fibonacci sequence and include the first-order arrangement segment 145a (i.e., the first central waveguide 112' for the sequence extending in the first direction 141 and the second central waveguide 112" for the sequence extending in the second direction 143) through the sixth-order arrangement segment 145f. Moreover, while FIG. 2C depicts a plurality of waveguides 110 that include the first and second central waveguides 112', 112" and quasi-periodic sequences extending in both the first direction 141 and the second direction 143, it should be understood that the entire linear distribution 140 or merely a portion of the linear distribution 140 may comprise a quasi-periodic sequence.

Referring again to FIG. 2A-2C, it should be understood that the entire linear distribution 140 or merely a portion of the linear distribution 140 may comprise a quasi-periodic sequence. For example, the linear distribution 140 may comprise adjacent arrangement segments 145 corresponding with a first-order sequence segment through a second-order sequence segment, a first-order sequence segment through a third-order sequence segment, a first-order sequence segment through a fourth-order sequence segment, a first-order sequence segment through a fifth-order sequence segment, a first-order sequence segment through a sixth-order sequence segment, a first-order sequence segment through a seventh-order sequence segment, a first-order sequence segment through an eighth-order sequence segment, and so on. Thus, it should be understood that the linear distribution 140 may comprise any number of arrangement segments corresponding to any number of sequence segments. Further, in some embodiments, the linear distribution 140 comprises at least one arrangement segment 145 corresponding with a third-order sequence segment or higher, a fourth-order sequence segment or higher, fifth-order sequence segment or higher, sixth-order sequence segment or higher, seventh-order sequence segment or higher or the like. In some embodiments, the linear distribution 140 comprises arrangement segments 145 corresponding with a third-order sequence segment and a fourth-order sequence segment, a fourth-order sequence segment and a fifth-order sequence segments, a third-order sequence segment through a fourth-order sequence segment, or the like.

Figure 3B:
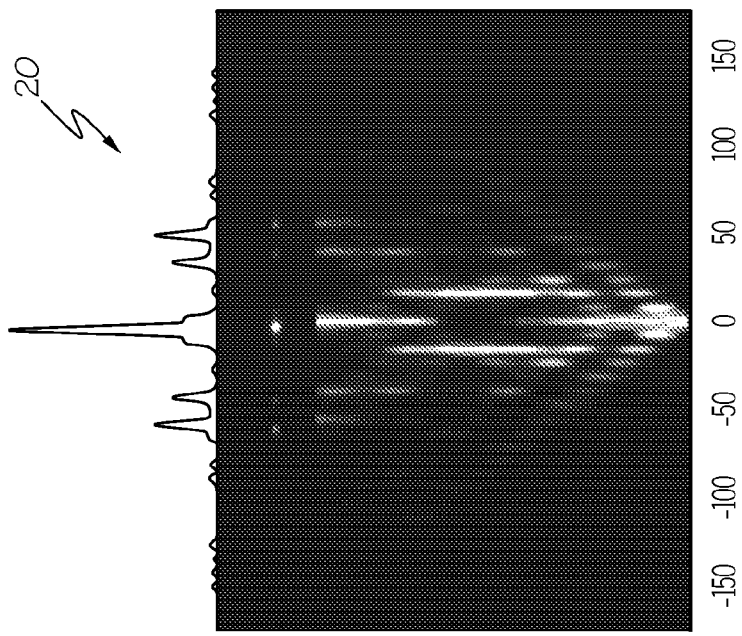
FIG. 3B graphically depicts a photon probability distribution determined using another embodiment of a communications system, according to one or more embodiments shown and described herein.
Figure 3A:
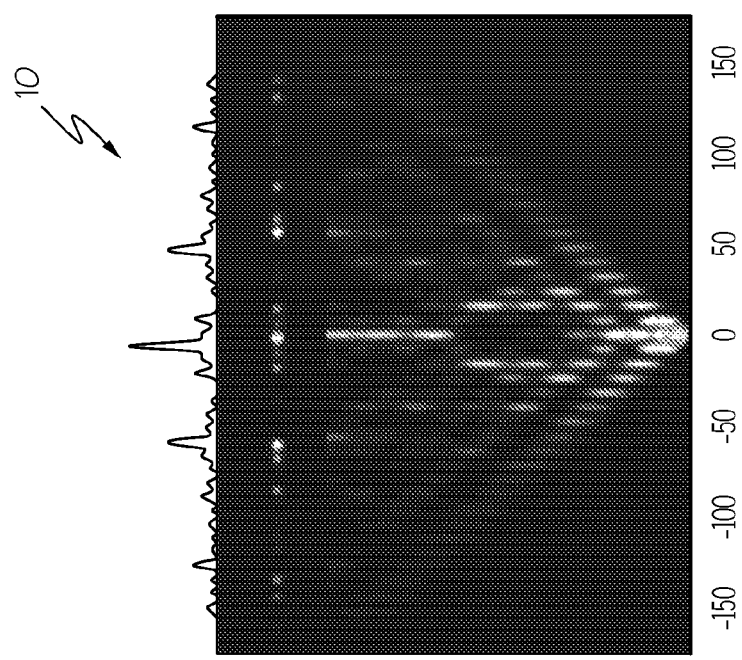
FIG. 3A graphically depicts a photon probability distribution determined using an embodiment of a communications system, according to one or more embodiments shown and described herein.

Referring now to FIGS. 1 and 2B, in some embodiments, when the waveguide array 101 includes the central waveguide 112 as depicted in FIG. 2B, at least one of the one or more photon generators 180 may be optically coupled to the input end 114 of the central waveguide 112. This facilitates quantum walks that start with directing a plurality of photons generated by the photon generator 180 into the central waveguide 112. As an example, FIGS. 3A and 3B depict photon probability distributions 10 (FIG. 3A) and 20 (FIG. 3B) determined by directing a plurality of photons generated using the photon generator 180 into the input end 114 the central waveguide 112 and receiving the plurality of photons using the one or more photon detectors 190 optically coupled to the output end 116 of each of the plurality of waveguide 110 of the waveguide array 101.

The photon probability distribution 10 is generated using the waveguide array 101 depicted in FIG. 2B, in which the quasi-periodic sequence is a Fibonacci sequence, the first waveguides 120 comprise an index of refraction $n_{WG1}$ such that $|n_{WG1}-n_{CLAD}|$ is 0.0035 and the second waveguides 130 comprise and index of refraction $n_{WG2}$ such that $|n_{WG2}-n_{CLAD}|$ is 0.0040. Further, the photon probability distribution 20 is generated using the waveguide array 101 depicted in FIG. 2B, in which the quasi-periodic sequence is a Fibonacci sequence, the first waveguides 120 comprise an index of refraction $n_{WG1}$ such that $|n_{WG1}-n_{CLAD}|$ is 0.0035 and the second waveguides 130 comprise and index of refraction $n_{WG2}$ such that $|n_{WG2}-n_{CLAD}|$ is 0.0045. As shown in FIGS. 3A and 3B, the photon probability distributions 10, 20 are formed by localized quantum walks. Moreover, the larger refractive index difference between the first waveguides 120 and the second waveguides 130 in the example of FIG. 3B induces stronger localization.

Figure 3D:
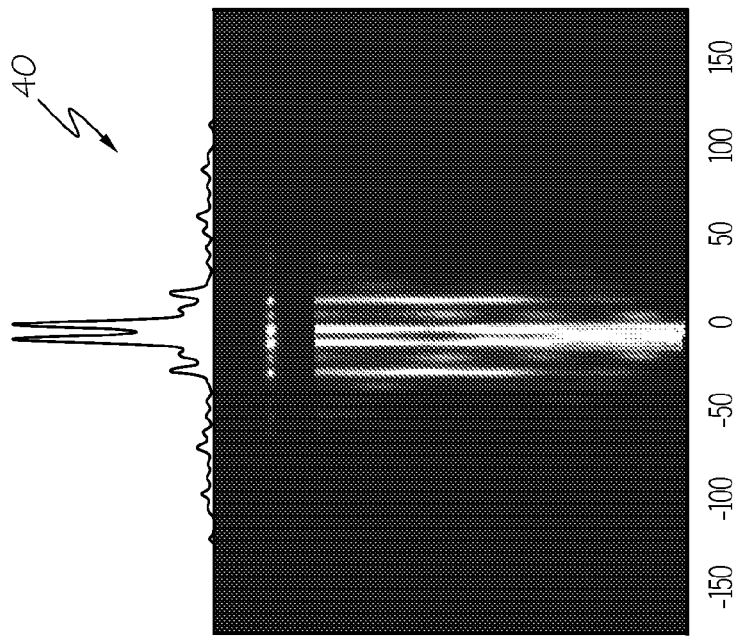
FIG. 3D graphically depicts a photon probability distribution determined using another embodiment of a communications system, according to one or more embodiments shown and described herein.
Figure 3C:
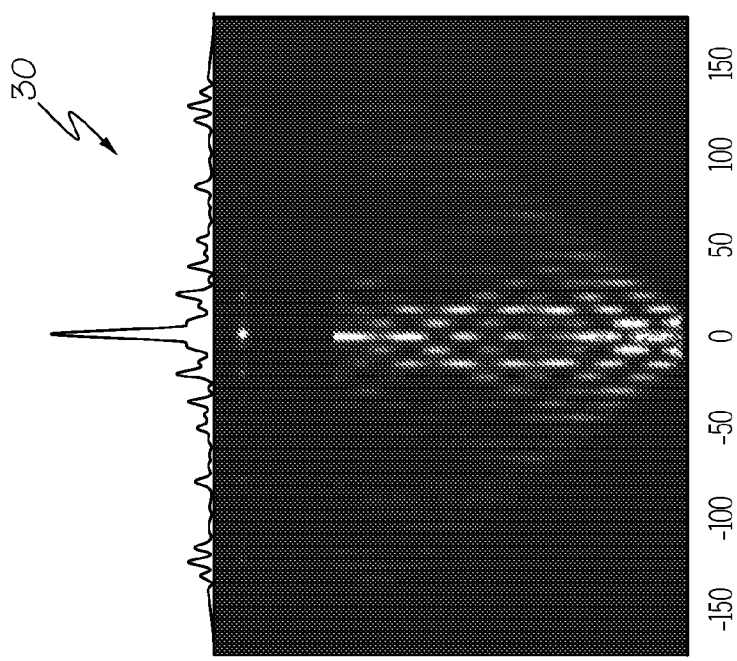
FIG. 3C graphically depicts a photon probability distribution determined using another embodiment of a communications system, according to one or more embodiments shown and described herein.

Referring again to FIGS. 1 and 2B, in other embodiments, the one or more photon generators 180 may comprise a first photon generator optically coupled to the input end 114 of an individual waveguide directly adjacent the central waveguide 112 in the first direction 141 and a second photon generator optically coupled to the input end 114 of an individual waveguide directly adjacent to the central waveguide 112 in the second direction 143. This facilitates quantum walks that start with directing a plurality of photons generated by the first and second photon generators into the two individual waveguides directly adjacent the central waveguide 112, for example, simultaneously. As an example, FIG. 3C depicts a photon probability distribution 30 determined by directing a plurality of photons generated using the first photon generator into the individual waveguide directly adjacent the central waveguide 112 in the first direction 141 and directing a plurality of photons generated using the second photon generator into the individual waveguide directly adjacent the central waveguide 112 and receiving the plurality of photons using the one or more photon detectors 190 optically coupled to the output end 116 of each of the plurality of waveguide 110 of the waveguide array 101. The photon probability distribution 30 is generated using the waveguide array 101 depicted in FIG. 2C, in which the quasi-periodic sequence is a Fibonacci sequence. As shown in FIG. 3C, the photon probability distribution 30 is formed by a symmetrical localized quantum walk.

Referring now to FIGS. 1 and 2C, in some embodiments, when the waveguide array 101 includes the first central waveguide 112' and the second central waveguide 112" as depicted in FIG. 2C, the one or more photon generators 180 may comprise a first photon generator optically coupled to the input end 114 of the first central waveguide 112' and a second photon generator optically coupled to the input end 114 of the second central waveguide 112". This facilitates quantum walks that start with directing a plurality of photons generated by the first and second photon generators into the two individual waveguides directly adjacent the central waveguide 112, for example, simultaneously. As an example, FIG. 3D depicts a photon probability distribution 40 determined by directing a plurality of photons generated using the first photon generator into the first central waveguide 112' and directing a plurality of photons generated using the second photon generator into the second central waveguide 112" and receiving the plurality of photons using the one or more photon detectors 190 optically coupled to the output end 116 of each of the plurality of waveguide 110 of the waveguide array 101. The photon probability distribution 40 is generated using the waveguide array 101 depicted in FIG. 2D, in which the quasi-periodic sequence is a Fibonacci sequence. As shown in FIG. 3D, the photon probability distribution 40 is formed by a symmetrical localized quantum walk.

Figure 3E:
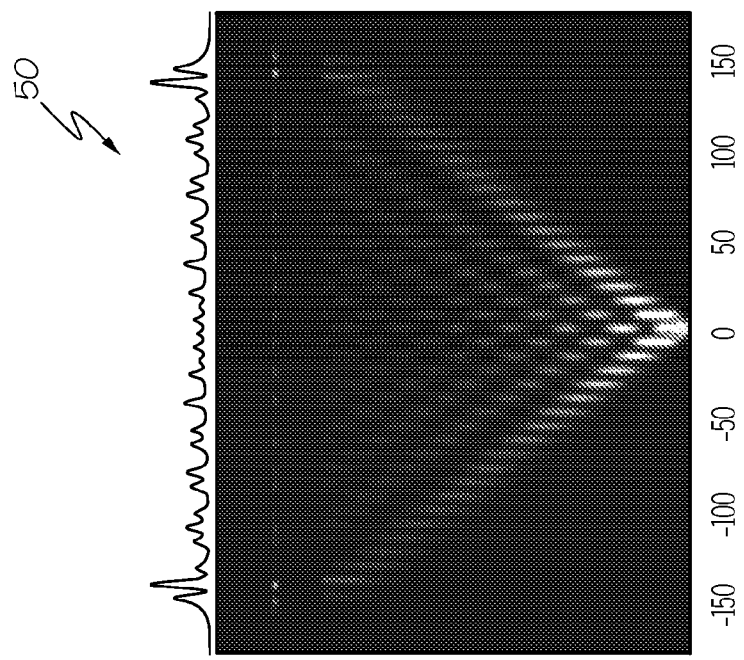
FIG. 3E graphically depicts a photon probability distribution determined using a comparative communications system, according to one or more embodiments shown and described herein.

Further, as a comparative example, FIG. 3E depicts a photon probability distribution 50 using a waveguide array that comprises a plurality of identical waveguides that comprise a diameter of 4 µm, an index of refraction $n_{WG}$ such that $|n_{WG}-n_{CLAD}|$ is 0.0035 and a spacing distance D between adjacent waveguides of 8 µm. As shown in FIG. 3E, the photon probability distribution 50 is not formed by a localized quantum walk.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A waveguide array comprising:
   a plurality of waveguides disposed in a substrate, wherein:
   the plurality of waveguides comprise one or more first waveguides and one or more second waveguides;
   the one or more first waveguides comprise a first propagation constant, the one or more second waveguides comprise a second propagation constant, and the first propagation constant is different than the second propagation constant;
   the one or more first waveguides and the one or more second waveguides are disposed in the substrate in a linear distribution and at least a portion of the linear distribution is arranged based on a quasi-periodic sequence comprising a plurality of sequence segments, wherein:
   each sequence segment is determined based on a quasi-periodic function;
   each sequence segment comprises an order; and each sequence segment corresponds to an arrangement segment of one or more first waveguides, one or more second waveguides, or a combination thereof; and the linear distribution of the first and second waveguides disposed in the substrate comprises at least one arrangement segment corresponding with a third-order sequence segment or higher of the quasi-periodic sequence.

2. The waveguide array of claim 1, wherein at least a portion of the linear distribution comprises adjacent arrangement segments corresponding with a first-order sequence segment through a fifth-order sequence segment of the quasi-periodic sequence.

3. The waveguide array of claim 1, wherein at least a portion of the linear distribution comprises adjacent arrangement segments corresponding with at least the third-order sequence segment and a fourth-order sequence segment of the quasi-periodic sequence.

4. The waveguide array of claim 1, wherein the third-order sequence segment of the quasi-periodic sequence corresponds to an arrangement segment comprising at least one first waveguide and at least one second waveguide.

5. The waveguide array of claim 1, wherein:
the quasi-periodic sequence comprises a Fibonacci sequence;
the quasi-periodic function of the Fibonacci sequence comprises $S_{N+1}=S_{N-1}S_N$; and
$S_N$ comprises a sequence segment of an N-order and corresponds to an N-order arrangement segment.

6. The waveguide array of claim 5, wherein:
$S_1$=A, wherein A comprises a first-order sequence segment and corresponds to a first-order arrangement segment comprising an individual first waveguide;
$S_2$=B, wherein B comprises a second-order sequence segment and corresponds to a second-order arrangement segment comprising an individual second waveguide;
$S_3=S_1S_2$=AB, wherein AB comprises the third-order sequence segment and corresponds to a third-order arrangement segment comprising the first-order arrangement segment adjacent the second-order arrangement segment; and
$S_4=S_2S_3$=BAB, wherein BAB comprises a fourth-order sequence segment and corresponds to a fourth-order arrangement segment comprising the second-order arrangement segment adjacent the third-order arrangement segment.

7. The waveguide array of claim 1, wherein:
the quasi-periodic sequence comprises a Thue-Morse sequence;
the quasi-periodic function of the Thue-Morse sequence comprises $T_{N\leftarrow 1}T_N\overline{T_N}$;
$T_N$ comprises a sequence segment of an N-order and corresponds to an N-order arrangement segment; and
$\overline{T_N}$ comprises a sequence segment of the Boolean complement of the $T_N$ sequence segment and corresponds to the Boolean complement of the N-order arrangement segment.

8. The waveguide array of claim 7, wherein
$T_1$=A, wherein A comprises a first-order sequence segment and corresponds to a first-order arrangement segment comprising an individual first waveguide;
$T_2$=B, wherein B comprises a second-order sequence segment and corresponds to a second-order arrangement segment comprising an individual second waveguide;
$T_3=T_2\overline{T_2}$=BA, wherein BA comprises the third-order sequence segment and corresponds to a third-order arrangement segment comprising the second-order arrangement segment adjacent the Boolean complement of the second-order arrangement segment; and
$T_4=T_3\overline{T_3}$BAAB, wherein BAAB comprises a fourth-order sequence segment and corresponds to a fourth-order arrangement segment comprising the third-order arrangement segment adjacent the Boolean complement of the third-order arrangement segment.

9. The waveguide array of claim 1, wherein:
the quasi-periodic sequence comprises a Rudin-Shapiro sequence;
the quasi-periodic function of the Rudin-Shapiro sequence comprises a four-element substitution sequence where P →PQ, Q →PR, R→SQ, and S →SR, such that:
$S_1$=P;
$S_2$=PQ;
$S_3$=PQPR
$S_4$=PQPRPQSQ; and
$S_5$=PQPRPQSQPRSRPR wherein the four-element substitution sequence is mapped onto a two element sequence where (P,Q)→A and (R,S) →B, each instance of A corresponds to an individual first waveguide t and each instance of B corresponds to an individual second waveguide such that:
$S_1$=A, wherein $S_1$ is a first-order sequence segment and corresponds to a first-order arrangement segment that comprises A;
$S_2$=AA, wherein $S_2$ is a second-order sequence segment and corresponds to a second-order arrangement segment that comprises AA;
$S_3$=AAAB, wherein $5_3$ is the third-order sequence segment and corresponds to a third-order arrangement segment that comprises AAAB;
$S_4$=AAABAABA, wherein $S_4$ is a fourth-order sequence segment and corresponds to a fourth-order arrangement segment that comprises AAABAABA; and
$S_5$=AAABAABAABBBAB, wherein $S_5$ is a fifth-order sequence segment and corresponds to a fifth-order arrangement segment that comprises AAABAABAABBBAB.

10. The waveguide array of claim 1, wherein the plurality of waveguides comprise single mode waveguides.

11. The waveguide array of claim 1, wherein:
the one or more first waveguides comprise a first V-number $V_1$ and the one or more second waveguides comprise a second V-number $V_2$;

$$V_1 = (2\pi a_1)\left(\frac{NA_1}{\lambda}\right), \text{ where } NA_1 = (n_{WG1} - n_{CLAD})^{\frac{1}{2}},$$

$n_{WG1}$ is the refractive index of the one or more first waveguides, $n_{CLAD}$ is the refractive index of the substrate, $a_1$ his a radius of the one or more first waveguides, and λ is the wavelength of one or more photons propagating along the one or more first waveguides;

$$V_2 = (2\pi a_2)\left(\frac{NA_2}{\lambda}\right) \text{ where } NA_1 = (n_{WG1} - n_{CLAD})^{\frac{1}{2}},$$

$n_{WG2}$, is the refractive index of the one or more second waveguides, $n_{CLAD}$ is the refractive index of the substrate, $a_2$ is a radius of the one or more second waveguides, and $\lambda$ is the wavelength of one or more photons propagating along the plurality of waveguides; and
$V_1 \neq V_2$.

12. The waveguide array of claim 1, wherein:
the plurality of waveguides are uniformed spaced in the linear distribution; and
a spacing distance between each adjacent pair of waveguides in the plurality of waveguides comprises about 30 μm or less.

13. The waveguide array of claim 1, wherein:
the plurality of waveguides comprises a central waveguide comprising a first waveguide;
a first section of the linear distribution extends in a first direction from the central waveguide and comprises at least one arrangement segment corresponding with the third-order sequence segment or higher of the quasi-periodic sequence; and
a second section of the linear distribution extends in a second direction from the central waveguide and comprises at least one arrangement segment corresponding with the third-order sequence segment or higher of the quasi-periodic sequence.

14. A communications system comprising:
the waveguide array of claim 13;
a photon generator optically coupled to an input end of at least one waveguide of the plurality of waveguides; and
one or more photon detectors optically coupled to an output end of at least one waveguide of the plurality of waveguides.

15. The communications system of claim 14, wherein the photon generator is optically coupled to the input end of the central waveguide of the plurality of waveguides.

16. The communications system of claim 14, wherein:
the photon generator comprises a first photon generator optically coupled to the input end of an individual waveguide directly adjacent the central waveguide in the first direction; and
a second photon generator is optically coupled to the input end of an individual waveguide directly adjacent the central waveguide in the second direction.

17. The waveguide array of claim 1, wherein:
the plurality of waveguides comprises a pair of adjacent central waveguides each comprising a first waveguide;
a first section of the linear distribution extends in a first direction from a first central waveguide and comprises at least one arrangement segment corresponding with a fourth-order sequence segment of the quasi-periodic sequence or higher; and
a second section of the linear distribution extends in a second direction from a second central waveguide and comprises at least one arrangement segment corresponding with the fourth-order sequence segment of the quasi-periodic sequence or higher.

18. A communications system comprising:
the waveguide array of claim 17;
a first photon generator optically coupled to an input end of the first central waveguide of the plurality of waveguides;
a second photon generator optically coupled to the input end of the second central waveguide of the plurality of waveguides; and
one or more photon detectors optically coupled to an output end of at least one waveguide of the plurality of waveguides.

19. A communications system comprising:
the waveguide array of claim 1;
a photon generator optically coupled to an input end of at least one waveguide of the plurality of waveguides; and
one or more photon detectors optically coupled to an output end of at least one waveguide of the plurality of waveguides.

20. A method of determining a photon probability distribution, the method comprising:
directing a plurality of photons generated using a photon generator into an input end of an individual waveguide of a waveguide array, wherein the waveguide array comprises:
a plurality of waveguides disposed in a substrate, wherein:
the plurality of waveguides comprise one or more first waveguides and one or more second waveguides;
the one or more first waveguides comprise a first propagation constant, the one or more second waveguides comprise a second propagation constant,
and the first propagation constant is different than the second propagation constant;
the one or more first waveguides and the one or more second waveguides are disposed in the substrate in a linear distribution and at least a portion of the linear distribution is arranged based on a quasi-periodic sequence comprising a plurality of sequence segments, wherein:
each sequence segment is determined based on a quasi-periodic function;
each sequence segment comprises an order; and
each sequence segment corresponds to an arrangement segment of one or more first waveguides, one or more second waveguides, or a combination thereof; and
the linear distribution of the first and second waveguides disposed in the substrate comprises at least one arrangement segment corresponding with a third-order sequence segment or higher of the quasi-periodic sequence;
receiving the plurality of photons using a plurality of photon detectors, wherein each of the plurality of photon detectors is optically coupled to an output end of at least one of the plurality of waveguides; and
determining a photon probability distribution based on the plurality of photons received by the plurality of photon detectors.

* * * * *

UNITED STATES PATENT AND TRADEMARK OFFICE
CERTIFICATE OF CORRECTION

PATENT NO. : 11,165,508 B2
APPLICATION NO. : 17/261947
DATED : November 2, 2021
INVENTOR(S) : Nicholas Francis Borrelli et al.

Page 1 of 1

It is certified that error appears in the above-identified patent and that said Letters Patent is hereby corrected as shown below:

In the Claims

In Column 13, Line 53, Claim 7, delete "$T_{N+1}T_N\overline{T_N},$" and insert -- $T_{N+1} = T_N\overline{T_N},$ --, therefor.

In Column 13, Line 56, Claim 7, delete "$\overline{T_N}$comprises," and insert -- $\overline{T_N}$ comprises --, therefor.

In Column 14, Line 6, Claim 8, delete "T$_4$=T$_3$T$_3$BAAB," and insert -- $T_4 = T_3\overline{T_3} = BAAB,$ --, therefor.

In Column 14, Line 22, Claim 9, delete "s$_5$" and insert -- S$_5$ --, therefor.

In Column 14, Line 34, Claim 9, delete "5$_3$" and insert -- S$_3$ --, therefor.

In Column 14, Line 57 (approx.), Claim 11, delete "n$_{cLAD}$" and insert -- n$_{CLAD}$ --, therefor.

In Column 14, Line 58 (approx.), Claim 11, delete "$a_1$ his" and insert -- $a_1$is --, therefor.

In Column 14, Line 66, Claim 11, delete "n$_{WG2}$," and insert -- n$_{WG2}$ --, therefor.

In Column 15, Line 4, Claim 11, delete "V$_1$≠v$_2$." and insert -- $V_1 \neq V_2$. --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*